US011868662B2

(12) United States Patent
Zamir et al.

(10) Patent No.: US 11,868,662 B2
(45) Date of Patent: Jan. 9, 2024

(54) STORAGE SYSTEM AND METHOD FOR HYBRID MAPPING

(71) Applicant: Western Digital Technologies, Inc., San Jose, CA (US)

(72) Inventors: Ran Zamir, Ramat Gan (IL); Alexander Bazarsky, Holon (IL); David Avraham, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 53 days.

(21) Appl. No.: 17/752,470

(22) Filed: May 24, 2022

(65) Prior Publication Data

US 2023/0384973 A1 Nov. 30, 2023

(51) Int. Cl.
G06F 3/06 (2006.01)

(52) U.S. Cl.
CPC .......... *G06F 3/0659* (2013.01); *G06F 3/0607* (2013.01); *G06F 3/0622* (2013.01); *G06F 3/0679* (2013.01)

(58) Field of Classification Search
CPC .... G06F 3/0659; G06F 3/0607; G06F 3/0622; G06F 3/0679
See application file for complete search history.

(56) References Cited

U.S. PATENT DOCUMENTS

| | | | | |
|---|---|---|---|---|
| 11,474,699 | B1* | 10/2022 | Saha | H04L 9/0643 |
| 2009/0091990 | A1* | 4/2009 | Park | G11C 11/5628 |
| | | | | 365/189.011 |
| 2017/0017575 | A1* | 1/2017 | Razin | G06F 12/0868 |
| 2018/0075902 | A1* | 3/2018 | Shirakawa | G11C 29/52 |
| 2018/0189125 | A1* | 7/2018 | Karlik | G11C 29/52 |
| 2020/0133739 | A1* | 4/2020 | Jain | G06F 9/5077 |
| 2020/0159674 | A1* | 5/2020 | Morgan | G06F 12/1408 |
| 2020/0335146 | A1* | 10/2020 | Alrod | G06F 16/90339 |
| 2021/0334216 | A1* | 10/2021 | Gole | G06F 12/1009 |
| 2023/0090202 | A1* | 3/2023 | Fujimori | G11C 16/3445 |
| | | | | 365/185.11 |

OTHER PUBLICATIONS

Mellor; "Facebook's Kangaroo jumps over flash cache limitations"; downloaded from the Internet on May 24, 2022 at https://blocksandfiles.com/2021/10/29/facebooks-kangaroo-jumps-over-flash-cache-limitations/; Blocks & Files; Oct. 29, 2021; 2 pages.

Gunasekar et al.; "Kangaroo: A new flash cache optimized for tiny objects"; Engineering at Meta; Research in Brief, posted on Oct. 26, 2021 to Core Data, Open Source; downloaded from the Internet on May 24, 2022 at https://engineering.fb.com/2021/10/26/core-data/kangaroo/; 7 pages.

(Continued)

*Primary Examiner* — Nanci N Wong

(74) *Attorney, Agent, or Firm* — Crowell & Moring LLP (57) ABSTRACT

A storage system supports several memory mappings that translate data bits into different physical voltage levels in its non-volatile memory. The storage system receives a selection of one of the memory mappings from a host, which makes the selection based on an application or expected workload of the host. The storage system uses the selected memory mapping for a memory access operation, such as a read operation or a write operation.

14 Claims, 9 Drawing Sheets

(56) References Cited

OTHER PUBLICATIONS

Kim et al.; "Networking Storage—The Key to Value: Understanding the NVMe Key-Value Standard"; live webcast, Sep. 1, 2020; Association for Computing Machinery Digital Library; downloaded from the Internet on May 24, 2022 at https://www.snia.org/sites/default/files/ESF/Key-Value-Storage-Standard-Final.pdf; 31 pages.

McAllister et al.; "Kangaroo: Caching Billions of Tiny Objects on Flash"; SOSP '21: Proceedings of the ACM SIGOPS 28$^{th}$ Symposium on Operating Systems Principles; Association for Computing Machinery Digital Library; Downloaded from the Internet on May 24, 2022 at https://dl.acm.org/doi/10.1145/3477132.3483568; 20 pages.

"Samsung Key Value SSD enables High Performance Scaling"; Downloaded from the Internet on May 24, 2022 at https://www.samsung.com/semiconductor/global.semi.static/Samsung_Key_Value_SSD_enables_High_Performance_Scaling-0.pdf; 4 pages.

"NVMe® Base Specification 2.0 PreView" NVM Express Flash Memory Summit 2020; downloaded from the Internet on May 24, 2022 at https://nvmexpress.org/wp-content/uploads/NVMe-Specification-2.0-Preview-1.pdf; 20 pages.

\* cited by examiner

STORAGE SYSTEM AND METHOD FOR HYBRID MAPPING

BACKGROUND

A host can send write commands to store data in a memory of a storage system and send read commands to read data from the memory of the storage system. In some situations, non-volatile memory (e.g., flash) can be used as a data cache, which can offer much-larger capacities and lower-cost compared to volatile memory (e.g., DRAM). However, non-volatile memory may not be well suited for caching small data objects if the minimal write granularity is large and the non-volatile memory uses higher bits-per-cell configurations, such as quad-level cell (QLC) memory. Database management can be optimized to increase performance when caching small data objects.

DETAILED DESCRIPTION

The following embodiments generally relate to a storage system and method for hybrid mapping. In one embodiment, a storage system is provided comprising a non-volatile memory and a controller. The storage system supports a plurality of memory mappings that translate data bits into different physical voltage levels in the non-volatile memory. The controller is configured to: receive, from a host, a selection of one of the plurality of memory mappings, wherein the selection is based on an application or expected workload of the host; and use the selected memory mapping for a memory access operation.

In another embodiment, a method is provided that is performed by a host. The method comprises: creating a plurality of memory mappings that translate data bits into different physical voltage levels in the non-volatile memory; determining an expected workload of an application in the host; and sending, to the storage system, a selection of one of the plurality of memory mappings based on the expected workload.

In yet another embodiment, a storage system is provided comprising a non-volatile memory, wherein the storage system supports a plurality of memory mappings that translate data bits into different physical voltage levels in the non-volatile memory; means for receiving, from a host, a selection of one of the plurality of memory mappings, wherein the selection is based on a host application or a workload expected by the host; and means for using the selected memory mapping for a memory access operation.

Other embodiments are provided and can be used alone or in combination.

Figures 1A, 1B:
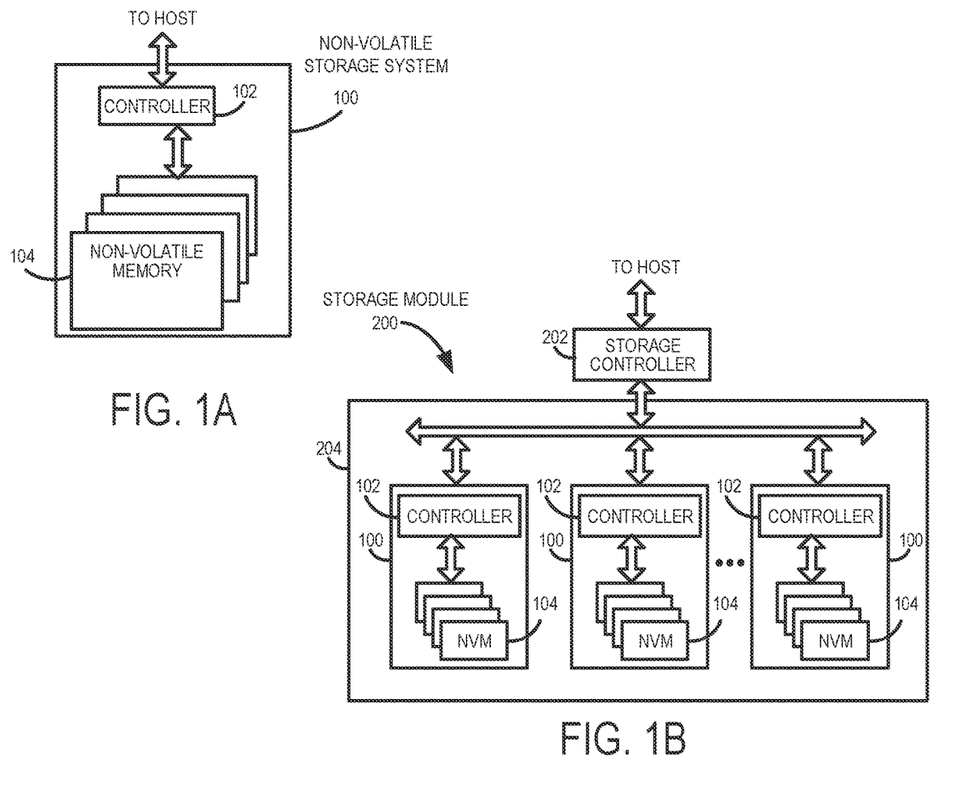
FIG. 1A is a block diagram of a non-volatile storage system of an embodiment.
FIG. 1B is a block diagram illustrating a storage module of an embodiment.
Figure 1C:
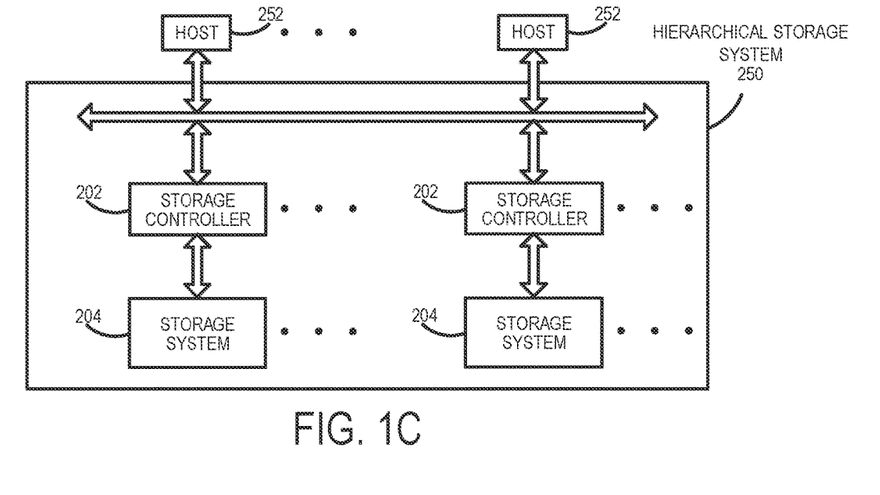
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
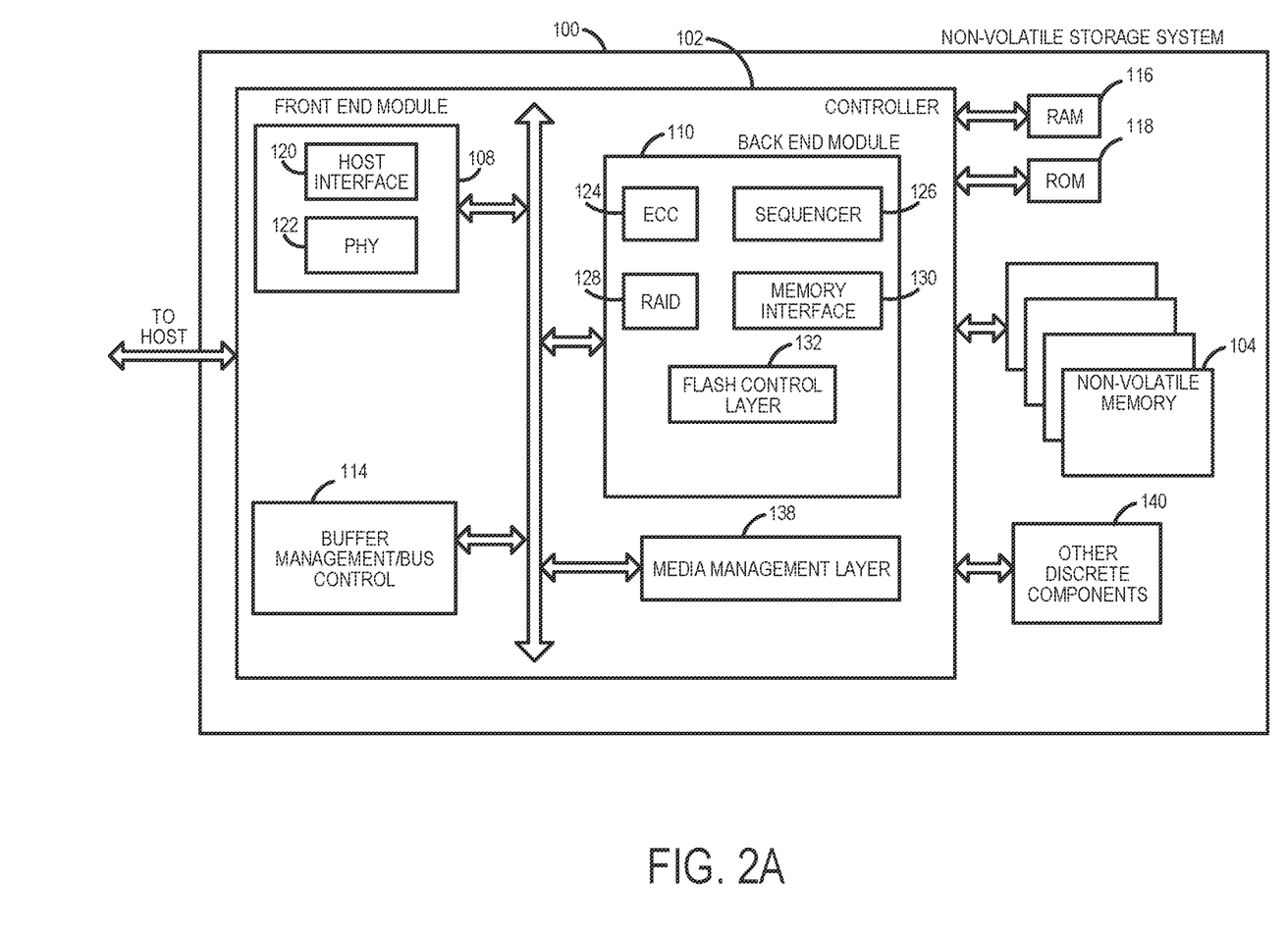
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
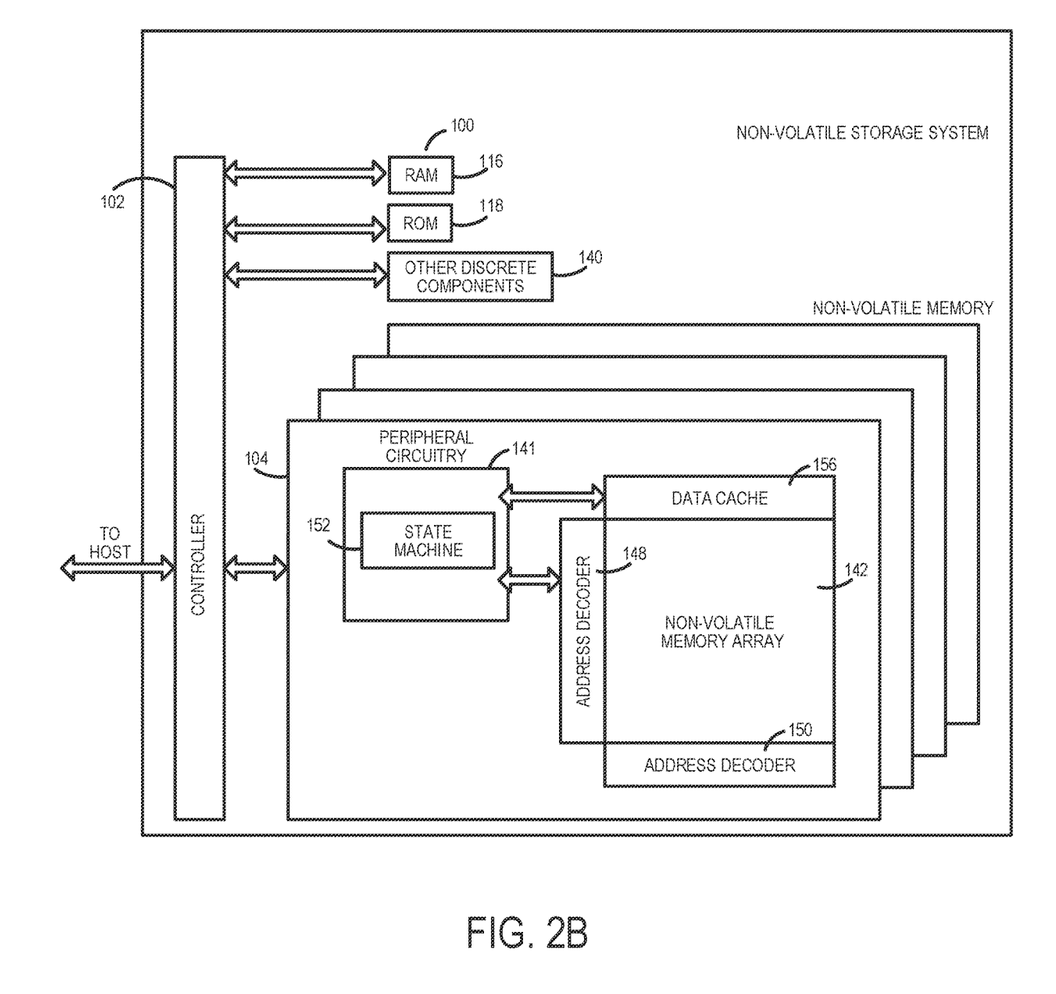
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
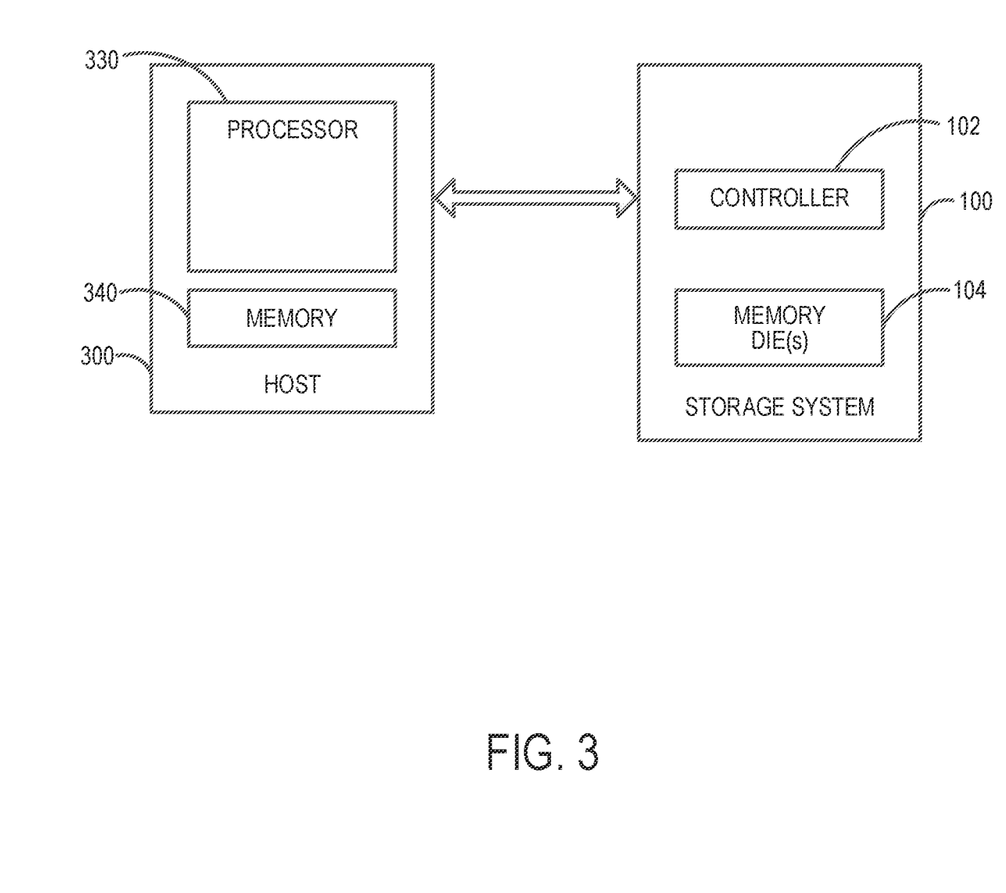
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

As mentioned above, in some situations, non-volatile memory (e.g., flash) can be used as a data cache, which can offer much-larger capacities and lower-cost compared to volatile memory (e.g., DRAM). However, non-volatile memory may not be well suited for caching small data objects if the minimal write granularity is large and the non-volatile memory uses higher bits-per-cell configurations, such as quad-level cell (QLC) memory. Database management can be optimized to increase performance when caching small data objects.

The following embodiments can be used to create a solution to this problem from the storage system side, which is independent from database management improvements, and can be generated for other use cases. In general, these embodiments can be used to support multiple mappings to allow for a workload-dependent NAND mapping that translates data bits into physical voltage levels (states), which can be beneficial in boosting performance for workloads using small data. One embodiment involves the use of a key-value (KV) database, and the following paragraphs provide some introductory information about a KV database. Although a "database" is used in these examples, it should be understood that any type of data structure (e.g., a table, mapping, etc.) can be used.

In general, a KV database works by storing a quantity of user data that is associated with a key that is addressable as complete entity (e.g., a photo, record, or file). From the host's point-of-view, the complete entity (in this example, a photo) can be retrieved using a single key/address rather than multiple addresses containing the data that makes up the photo. This has the potential of abstracting and simplifying database management for certain applications, which results in advantages in the performance of those applications.

In one embodiment of KV storage, data is stored as unstructured data, data is addressed by a key (which can be variable length), storage space is allocated in increments of bytes, and the key value is associated with the amount of physical storage necessary. In contrast, with block storage, data is stored in blocks of fixed size data that are addressed by logical block addresses (LBAs) (which can be a fixed number of bytes), storage space is allocated in integer multiples of block size, and logical blocks are associated one-to-one with physical blocks. There can be many KV applications implemented in software in a normal block input/output (I/O) storage device to implement database applications.

There are several advantages associated with KV storage devices (e.g., solid-state drives (SSDs)). One advantage of supporting a KV database on the storage device level is the increase in the performance in terms of transfers per second. This occurs for two reasons. First, the translation layer in the host from KV to block storage is removed. This removes two layers of mapping and transaction information, which increases the amount of transactions per second (write amplification) and reduces the latency. Second, the number of commands over the bus are reduced to a single transfer for the entire key KV pair. Another advantage of KV-SSD support is the simplification and enablement of computational storage (e.g., near-storage compute). The user data on the device can be identifiable as a complete unit as opposed to various pieces that may or may not be contiguous in a normal storage operation.

In summary, KV storage systems allow for optimizations, simplifications, and improvement in both the host (by abstracting data base management) and storage system (by taking advantage of the unique structure to achieve various advantages). Several vendors have been developing SSDs that present a KV database interface instead of a traditional block device, and the NVMe has added an application program interface (API) for supporting KV commands. Supporting a KV database only adds a little complexity to the flash translation layer, but it eliminates redundant abstractions on the host-software side, so performance can be increased compared to running a KV database application on top of a filesystem on a traditional SSD. As noted above, the flash translation layer (FTL) may include a logical-to-physical address (L2P) map (sometimes referred to herein as a table or data structure) that translates logical block addresses ("LBAs") from the host to physical addresses in the memory 104. As issue can arise in SSDs, where the FTL mapping may be too course or too fine, with too much or too little of the L2P stored in DRAM. Using a KV database can address this issue and increase performance.

In one embodiment, the storage system 100 supports multiple memory (e.g., NAND) mappings, and the host 300 can select the exact mapping to use according to the expected workload (which the host 300 is most familiar with). This is in contrast to prior storage system that support a fixed memory mapping These mappings are used in a fixed way in that only one mode can be used at given time, and they are neither host-configurable nor dependent on the exact workload or application.

In one embodiment, hybrid memory mapping is used according to host-defined namespaces or application. Configuring of the exact mapping can be associated with the NVMe namespaces that the host 300 sets-up in the storage system 100 or can be done by explicit signaling, such as user-defined commands. The idea is that the host 300 will have different namespaces/address ranges with different memory mappings that are most suited for each workload/application.

In another embodiment, hybrid memory mapping is used for KV databases. In this embodiment, the host 300 can explicitly configure the memory mapping according to KV format or KV size when setting up the KV format. KV protocols allow for flexible value sizes, which may vary from several bytes long and up to four GBs. The length of the values tends to correspond to the type of the host object. Objects may be large videos or data files, which can make very long values. Images, music, and documents can make moderate size values (e.g., a few MBs), and shorter objects may correspond to leaves in larger data structures, log entries, etc. With awareness to the application, the host 300 can define the memory mapping when setting up the KV formats to best optimize each application.

Figure 4:
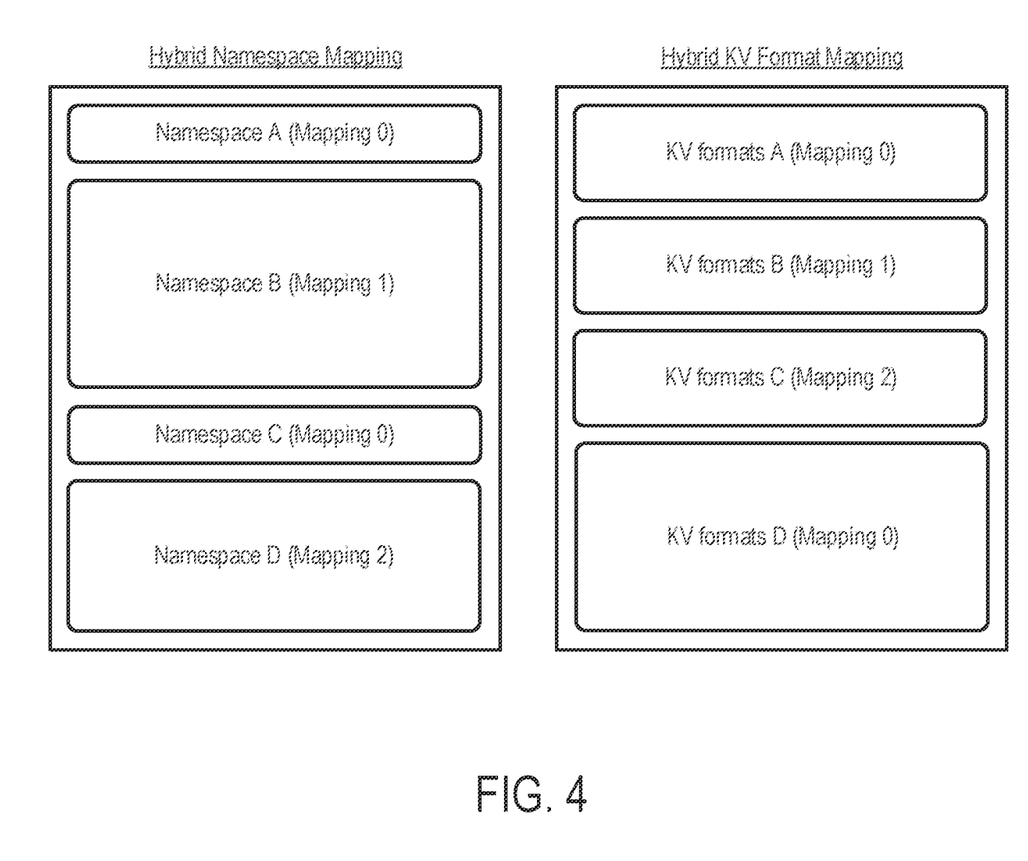
FIG. 4 is a diagram of storage system of an embodiment with multiple memory mappings

In yet another embodiment, the controller 102 of the storage system 100 can decide the memory mapping according to KV size and/or KV format. For example, the NVMe standard dictates that KV entries must be written and read sequentially. Using this knowledge, the controller 102 of the storage system 100 can use memory mapping that is optimized for reliability. On the other hand, small KV entries can be written to memory blocks that are optimized for random write/read. This is illustrated in FIG. 4, which shows a logical view of the memory 104 and illustrates multiple memory mappings. Each mapping can have different trade-offs in terms of reliability, read performance, write performance, data recoverability during unexpected power loss, etc. This embodiment allows the host 300 to select the mapping that provides the best optimization for its requirements/workloads/applications.

Figure 5:
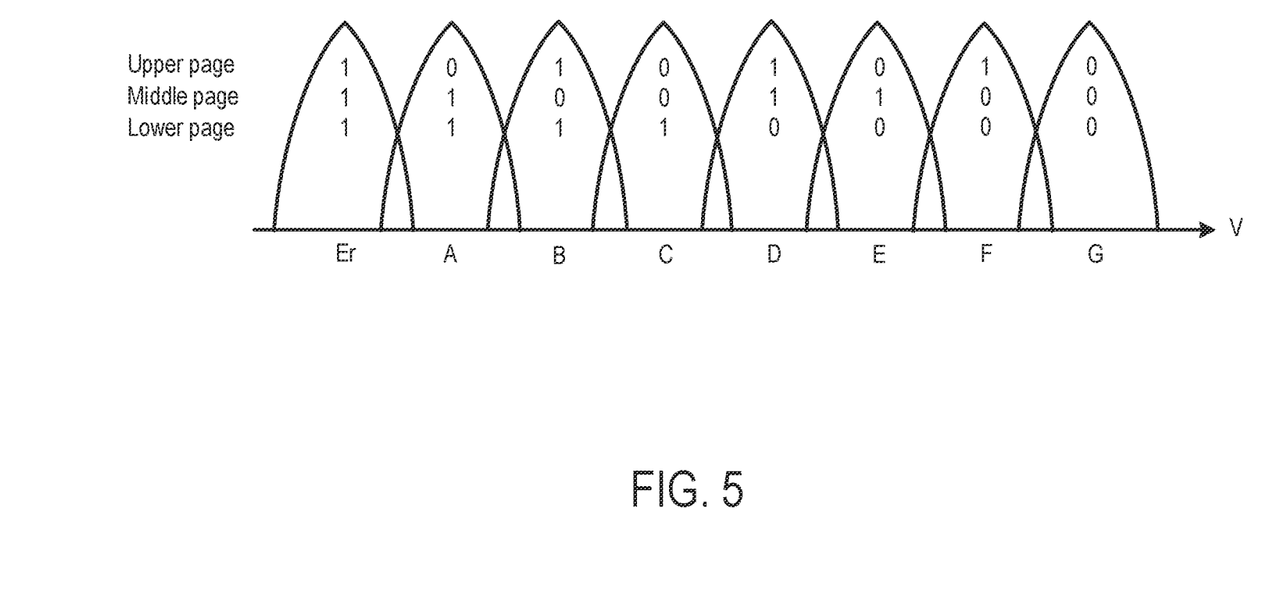
FIG. 5 is a diagram of a separable binary mapping of an embodiment.

One problem with using non-volatile memory caches is the large size of the minimal memory write unit. To run efficiently, the controller 102 of the storage system 100 can buffer and write at least one wordline on multiple dies. Typically, a single wordline is relatively large (e.g., containing 48 KB/64 KB of user data for X3/X4, respectively). However, there are many workloads containing data objects that are significantly smaller. In order to reduce the minimal write unit, separable binary mapping (SBM) can be used, as illustrated in FIG. 5. As shown in FIG. 5, separable binary mapping (SBM) can be 1-2-4 (X3) or 1-2-4-8 (X4) or 1-2-4-8-16 (X5). This mapping is non-balanced in terms of the number of thresholds per page, so it may not be very good in terms of reliability. However, it has a very-desirable advantage in that it is fully separable between logical pages. That is, the memory 104 can be programmed page-by-page, which is different from common mappings where all pages are needed upfront for programming. This mapping is very useful for workloads that work as a cache and have reduced reliability requirements but need to support small write accesses.

Figure 6:
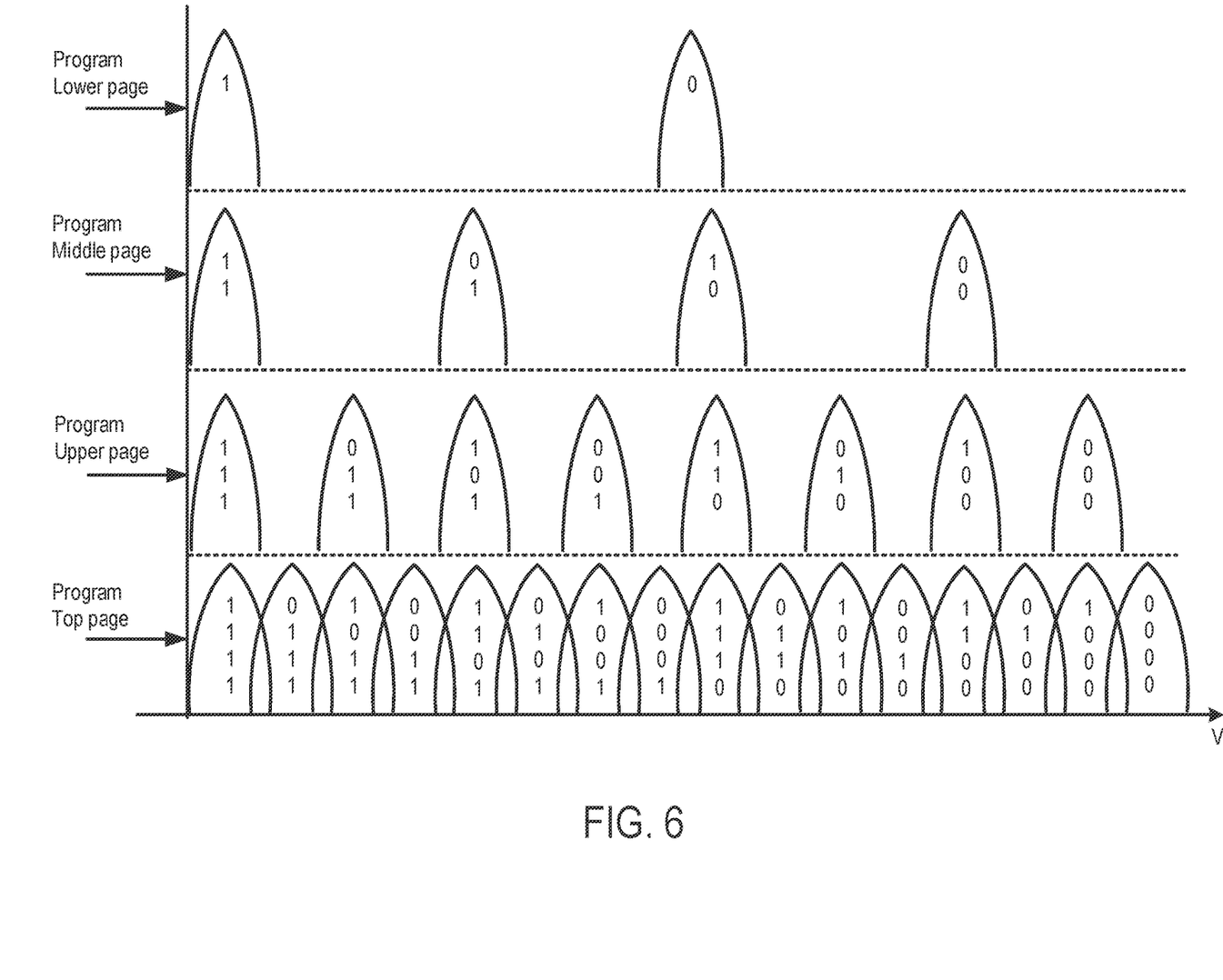
FIG. 6 is a diagram illustrating a programming operation of an embodiment.

The simplified program sequence is illustrated in FIG. 6, which shows programming an X4 page with 1-2-4-8 mapping. The separable binary mapping may not be optimal in terms of bit error rate (BER) balancing. However, in many of these workloads, the data is "hot," and the reliability requirements may be relaxed (e.g., a reduced data retention period, a reduced xTemp requirement, and less reliability in general as this is just a cache). Furthermore, this allows for using denser memories such X4 (or X5 in the future), while still allowing for partial programming for each logical page. Selecting the SBM mapping and using its bottom pages for the non-volatile memory cache can reduce the smallest write unit from 48 KB/64 KB per die to 16 KB per die and allow using a denser TLC/QLC memory for this case (unlike traditional SLC). This provides the flexibility that the memory 104 may be written again with more data if needed.

Figure 7:
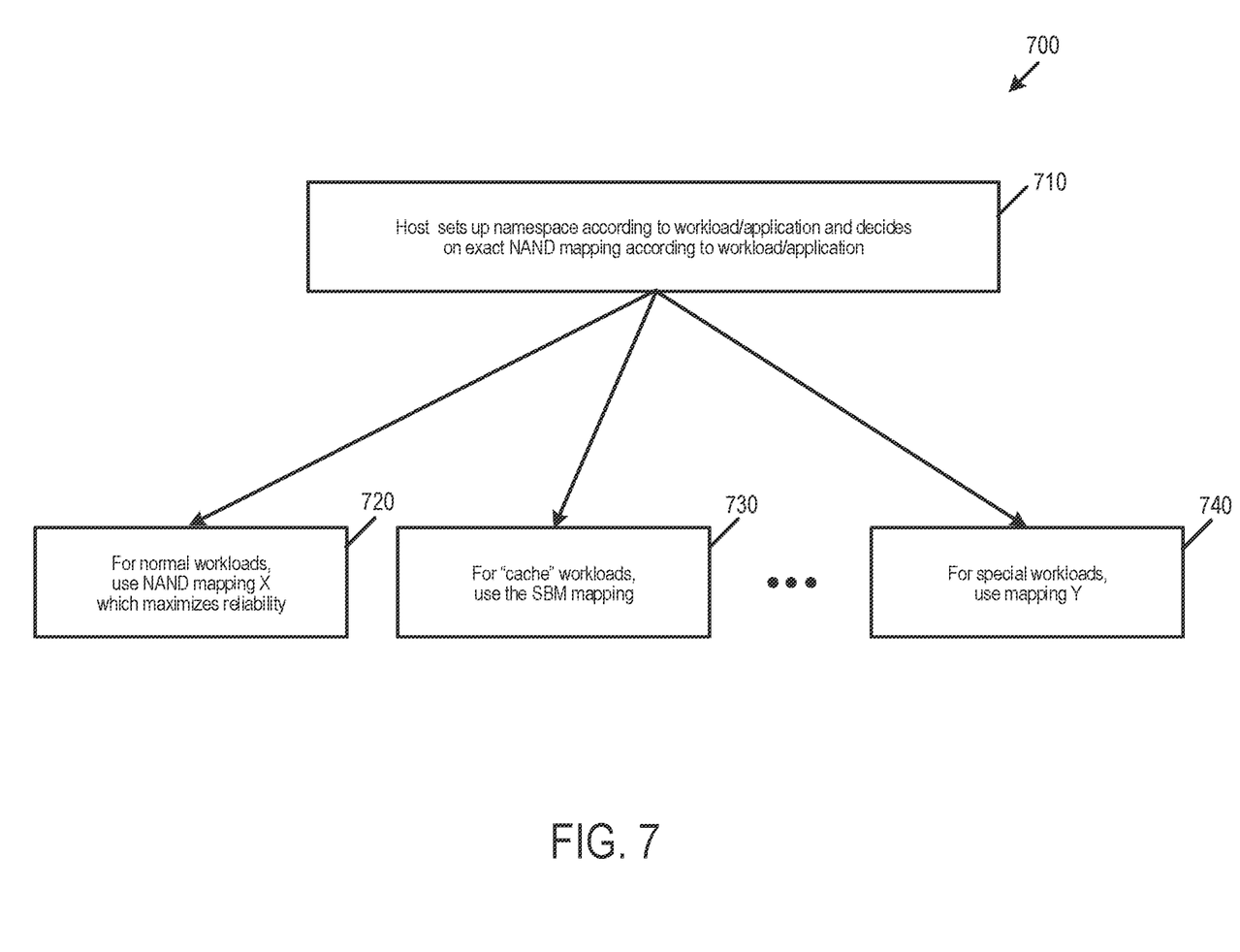
FIG. 7 is a flowchart of a hybrid namespace mapping method of an embodiment.

Turning again to the drawings, FIG. 7 is a flowchart 700 of a hybrid namespace mapping method of an embodiment. As shown in FIG. 7, in this method, the host 300 sets up a namespace according to a workload or application and decides on the exact memory mapping according to the workload/application (act 710). For normal workloads, the controller 102 of the storage system 100 can use memory mapping X, which maintains reliability (act 720). For "cache" workloads, the controller 102 can use SBM mapping (act 730). For special workloads, the controller 102 can use mapping Y (act 740). Other mapping alternatives can be used. Also, it should be understood that this is merely an example, and the details of this and other examples presented herein should not be read into the claims unless expressly recited therein.

Figure 8:
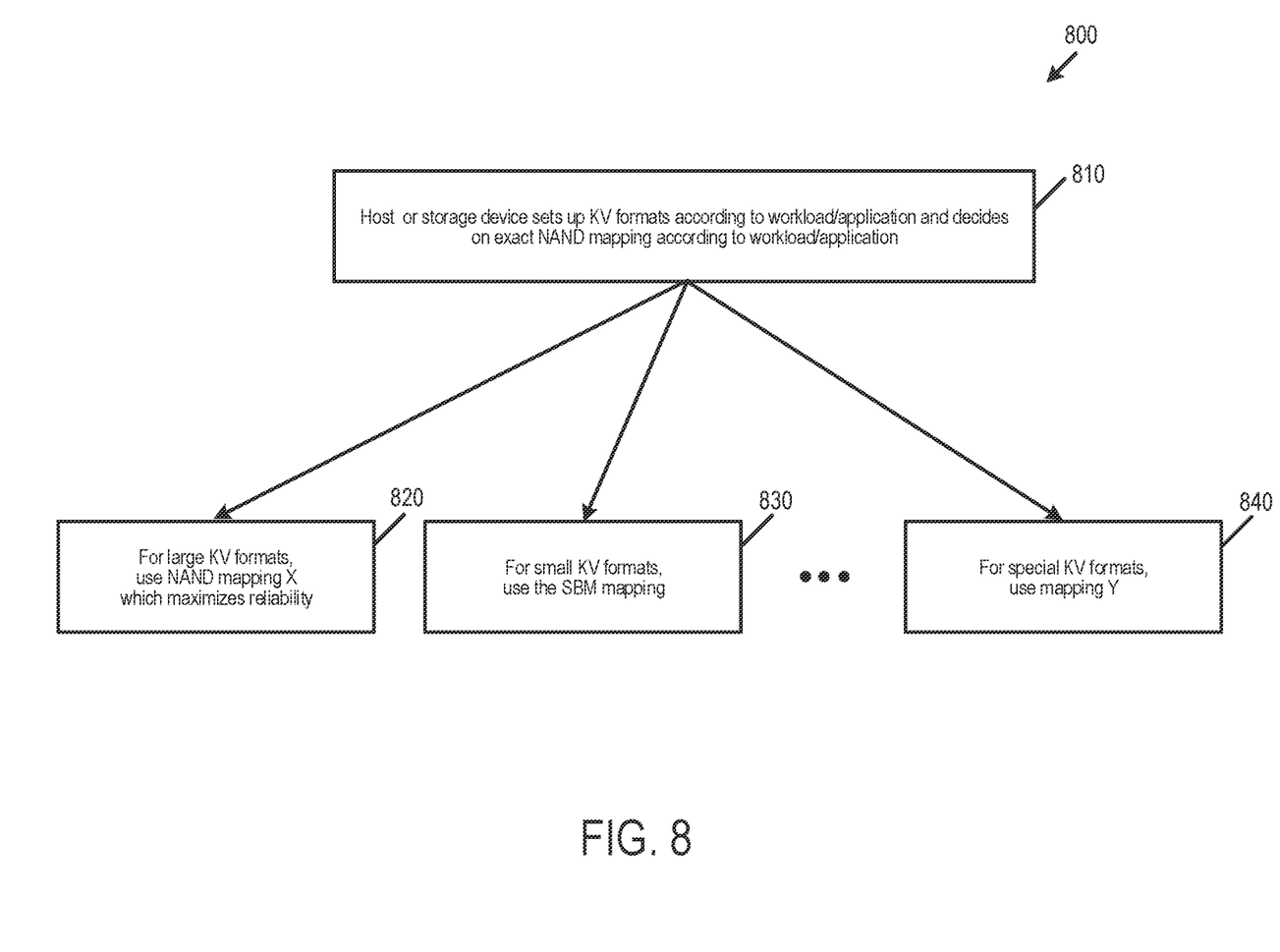
FIG. 8 is a flowchart of a hybrid key-value format mapping method of an embodiment.

FIG. 8 is a flowchart 800 of a hybrid key-value format mapping method of an embodiment. As shown in FIG. 8, the host 300 or storage system 100 sets-up KV formats according to the workload/application and decides on the exact memory mapping according to the workload/application (act 810). For large KV formats, the controller 102 uses memory mapping X, which maintains reliability (act 820). For KV formats, the controller 102 can use SBM mapping (act 830). For special KV formats, the controller 102 can use mapping Y (act 840). Other mapping alternatives can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. In a host coupled with a storage system comprising a non-volatile memory, a method comprising:
creating a plurality of memory mappings that translate data bits into different physical voltage levels in the non-volatile memory, wherein the plurality of mappings are created according to host-defined namespaces;

determining an expected workload of an application in the host; and sending, to the storage system, a selection of one of the plurality of memory mappings based on the expected workload, wherein the plurality of mappings comprises (i) a separable binary mapping (SBM) used for cache workloads and (ii) at least one mapping for a respective at least one other type of workload.

2. The method of claim 1, wherein the plurality of mappings are created based on a user-defined command.

3. The method of claim 1, wherein the plurality of mappings are used for a key-value data structure.

4. The method of claim 3, wherein the plurality of mappings are configured. according to a key-value format.

5. The method of claim 3, wherein the plurality of mappings are configured according to a key-value size.

6. A storage system comprising:
a non-volatile memory, wherein the storage system supports a plurality of memory mappings that translate data bits into different physical voltage levels in the non-volatile memory, wherein the plurality of mappings are created according to host-defined namespaces and comprises (i) a separable binary mapping (SBM) used for cache workloads and (ii) at least one mapping for a respective at least one other type of workload;

means for receiving, from a host, a selection of one of the plurality of memory mappings, wherein the selection is based on a host application or a workload expected by the host; and means for using the selected memory mapping for a memory access operation.

7. A storage system comprising:
a non-volatile memory, wherein the storage system supports a plurality of memory mappings that translate data bits into different physical voltage levels in the non-volatile memory; and a controller coupled with the non-volatile memory and configured to:
receive, from a host, a selection of one of the plurality of memory mappings, wherein:
the selection is based on an application or expected workload of the host;
the plurality of mappings are created according to host-defined namespaces;
the plurality of mappings comprises (i) a separable binary mapping (SBM) used for cache workloads and (ii) at least one mapping for a respective at least one other type of workload; and
use the selected memory mapping for a memory access operation.

8. The storage system of claim 7, wherein the plurality of mappings are selected based on a user-defined command.

9. The storage system of claim 7, wherein the plurality of mappings are used for a key-value data structure.

10. The storage system of claim 9, wherein the plurality of mappings are configured according to a key-value format.

11. The storage system of claim 9, wherein the plurality of mappings are configured according to a key-value size.

12. The storage system of claim 7, wherein the plurality of mappings are created by the host.

13. The storage system of claim 7, wherein the plurality of mappings are created by the storage system.

14. The storage system of claim 7, wherein the non-volatile memory comprises a three-dimensional memory.

* * * * *